United States Patent
Wu et al.

(10) Patent No.: US 7,840,194 B2
(45) Date of Patent: Nov. 23, 2010

(54) TRANSMITTING CIRCUIT, RECEIVING CIRCUIT, INTERFACE SWITCHING MODULE AND INTERFACE SWITCHING METHOD FOR SATA AND SAS INTERFACES

(75) Inventors: Yu-Hsin Wu, Hsin Chuang (TW); Min-Chung Chou, Miao Li County (TW); Hung-Chih Lin, Chu Pei (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 1076 days.

(21) Appl. No.: 11/546,919

(22) Filed: Oct. 13, 2006

(65) Prior Publication Data

US 2007/0115954 A1    May 24, 2007

(30) Foreign Application Priority Data

Oct. 18, 2005    (TW)    ............................... 94136259 A

(51) Int. Cl.
*H04B 1/02* (2006.01)

(52) U.S. Cl. .................. 455/107; 455/248.1; 455/78; 455/83; 375/219; 370/356

(58) Field of Classification Search .............. 455/107, 455/248.1, 78, 83, 13.3, 191.3, 63.3, 320, 455/330; 375/219, 249; 370/356, 401
See application file for complete search history.

(56) References Cited

U.S. PATENT DOCUMENTS

| | | | | |
|---|---|---|---|---|
| 3,560,807 A * | 2/1971 | Urfer et al. | .................. | 361/434 |
| 3,946,381 A * | 3/1976 | Johnson et al. | .............. | 365/116 |
| 4,714,945 A * | 12/1987 | Fujiwara et al. | ............... | 355/69 |
| 4,798,929 A * | 1/1989 | Itoh | ........................ | 219/69.12 |
| 5,157,629 A * | 10/1992 | Sato et al. | ................... | 365/201 |
| 5,187,685 A * | 2/1993 | Sato et al. | .............. | 365/189.09 |
| 5,537,126 A * | 7/1996 | Kayser et al. | ................. | 345/2.1 |
| 5,622,643 A * | 4/1997 | Morizot et al. | .............. | 219/625 |
| 5,875,386 A * | 2/1999 | Flickinger et al. | .......... | 455/3.01 |
| 5,912,700 A * | 6/1999 | Honey et al. | ................. | 348/157 |
| 6,211,799 B1 * | 4/2001 | Post et al. | ..................... | 341/33 |
| 6,768,770 B1 * | 7/2004 | Lipperer et al. | ............. | 375/219 |
| 6,953,954 B2 * | 10/2005 | Yoshii et al. | ................. | 257/194 |
| 6,990,256 B2 * | 1/2006 | Geary et al. | ................... | 385/2 |
| 7,098,770 B2 * | 8/2006 | Charrat et al. | ................ | 340/10.1 |
| 7,116,173 B2 * | 10/2006 | Tsutsui et al. | ............... | 330/285 |
| 7,158,573 B2 * | 1/2007 | Hershbarger | ................ | 375/258 |
| 7,193,562 B2 * | 3/2007 | Shtrom et al. | ......... | 343/700 MS |
| 7,336,132 B2 * | 2/2008 | Tsutsui et al. | ............... | 330/285 |
| 7,580,693 B2 * | 8/2009 | Rohde et al. | ................. | 455/326 |
| 2002/0000624 A1 * | 1/2002 | Takemura et al. | ........... | 257/390 |
| 2003/0032396 A1 * | 2/2003 | Tsuchiya et al. | ............. | 455/127 |
| 2004/0135169 A1 * | 7/2004 | Yoshii et al. | ................. | 257/107 |
| 2005/0218989 A1 * | 10/2005 | Tsutsui et al. | ............... | 330/285 |
| 2006/0117089 A1 * | 6/2006 | Karam | ....................... | 709/208 |
| 2007/0139086 A1 * | 6/2007 | Liu | ............................. | 327/108 |
| 2009/0309706 A1 * | 12/2009 | Mukherjee et al. | ......... | 340/10.1 |
| 2010/0097258 A1 * | 4/2010 | Koli | ........................... | 341/155 |

* cited by examiner

*Primary Examiner*—Minh D Dao
(74) *Attorney, Agent, or Firm*—Muncy, Geissler, Olds & Lowe, PLLC

(57) ABSTRACT

A transmitter circuit, a receiver circuit and an interface switching module for SATA or SAS interface are provided. The invention uses transistors as elements with different impedance and also provides impedance modulating method in coordination with the exterior circuit and the layout design so as to develop an auto-switching mechanism between SATA and SAS interfaces, thereby integrating two transmission interfaces in a single system.

24 Claims, 13 Drawing Sheets

TRANSMITTING CIRCUIT, RECEIVING CIRCUIT, INTERFACE SWITCHING MODULE AND INTERFACE SWITCHING METHOD FOR SATA AND SAS INTERFACES

This application claims the benefit of the filing date of Taiwan Application Ser. No. 094136259, filed on Oct. 18, 2005, the content of which is incorporated herein by reference.

BACKGROUND OF THE INVENTION

1. Field of the Invention

The invention generally relates to a computer transmission interface, and more specifically to a transmitting circuit, a receiving circuit, a transceiver circuit, an interface switching module and an interface switching method for Serial Advanced Technology Attachment (SATA) and Serial Attached Small Computer System Interface (SAS).

2. Description of the Related Art

FIG. 1 is a circuit diagram of a transmitting circuit in accordance with the SATA and the SAS standards. FIG. 2 is a circuit diagram of a receiving circuit in accordance with the SATA and the SAS standards.

Referring to FIG. 1 and FIG. 2, a transmitting circuit 100, including a switch 110 and two variable resistors 101, receives a transmitting data signal TXD to generate a first transmitting signal TXP and a second transmitting signal TXN. A receiving circuit 200, including a differential amplifier 210 and two variable resistors 101, receives a first receiving signal RXP and a second receiving signal RXN to generate a receiving data signal RXD. High-speed serial transmission interface specifications, such as SATA and SAS, define 50-ohm differential impedance elements 101 embedded in the transmitting circuit or the receiving circuit for impedance matching. Thus, when high-speed serial signals are transmitted via physical layer, even too much cyclic redundancy check (CRC) errors do not cause communication link failure. However, precision resistors are used as differential impedance elements in prior art but are not operable in impedance modulation.

Traditionally, a host or a device having same or different transmission interfaces uses a plurality of bridges for data transmission. A minimum of three transceivers is required for a bridge with a switching mechanism among a plurality of high-speed serial signals under the current SATA and SAS architecture, which is complex and high-cost in hardware design. If a plurality of transmission interfaces can be integrated in a single unit, it will significantly meet the convenience in use and reduce use cost.

SUMMARY OF THE INVENTION

In view of the above-mentioned problems, an object of the invention is to provide an interface switching module, by means of impedance modulation, for a system with a plurality of same or different transmission interfaces.

To achieve the above-mentioned object, the interface switching module, for a system with two serial transmission interfaces, comprises a first interface connector, a second interface connector and a transceiver circuit.

The first interface connector has a first transmitting signal pin, a second transmitting signal pin, a first receiving signal pin, a second receiving signal pin and a plurality of ground pins. All the ground pins are connected to the ground terminal of the system. A second interface connector has the same four signal pins as those of the first interface connector and a plurality of ground pins. At least one among the plurality of ground pins is floated. The four signal pins of the first interface connector are connected to the corresponding four signal pins of the second interface connector. At least one among the plurality of ground pins of the second interface connector is electrically connected to the plurality of ground pins of the first interface connector. According to the potential of the floated ground pin of the second interface connector, the transceiver circuit identifies whether there is a signal input from the second interface connector or not. When there is a signal input from the second interface connector, the transceiver circuit modulates the matching impedance of itself to a high impedance value, and thereby signals from the second interface connector outputs via the first interface connector. Contrarily, when there is no signal input from the second interface connector, the transceiver circuit modulates the matching impedance of itself to a predetermined impedance value, and thereby signals from the transceiver circuit output via the first interface connector.

Another object of the invention is to provide an interface switching method for a system having an interface switching module that switches between a first serial transmission interface and a second serial transmission interface. The interface switching method comprises: connecting the system with a first device having the first serial transmission interface; determining whether a second device having the second serial transmission interface is connected to the system; if the second device is connected to the system, disconnecting the system from the first device by using an impedance modulating method, and then returning to the step of determining; and if the second device is not connected to the system, connecting the system with the first device by using the impedance modulating method, and then returning to the step of determining.

A unique feature of the invention is that transistors are substituted for precision resistors as differential impedance elements embedded in the transmitting or receiving circuit of the physical layer transceiver. Also, by using the impedance modulating method, the invention not only has the same effect as precision resistors do, but also performs a switching function among high-speed serial signal flows, thereby developing a switching mechanism of a plurality of transmission interfaces.

DETAILED DESCRIPTION OF THE INVENTION

The transmitting circuit, the receiving circuit, the transceiver circuit, the interface switching module and method of the invention will be described with reference to the accompanying drawings.

Figure 1:
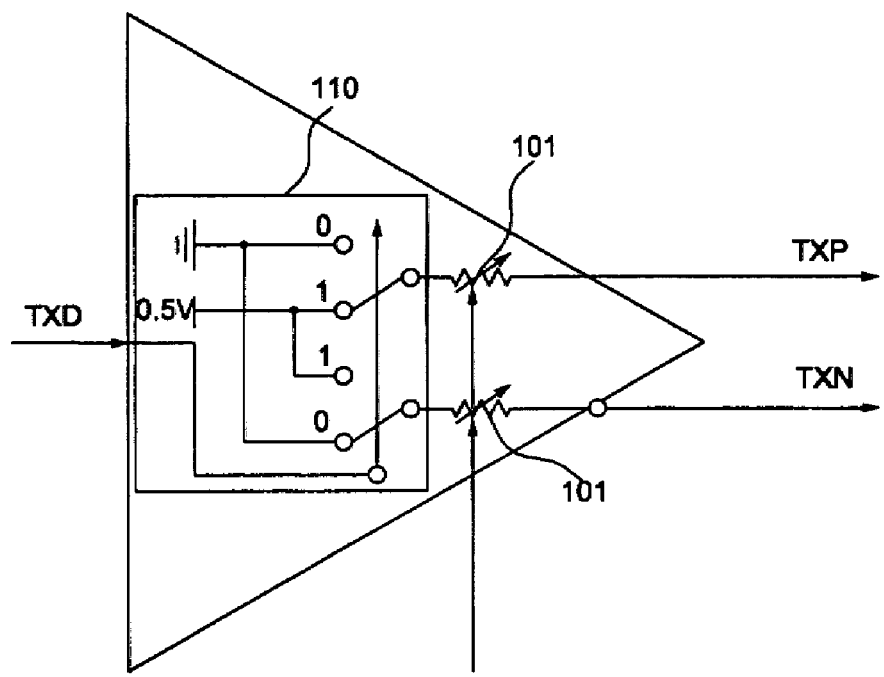
FIG. 1 is a circuit diagram of a transmitting circuit in accordance with the SATA and the SAS standards.
Figure 2:
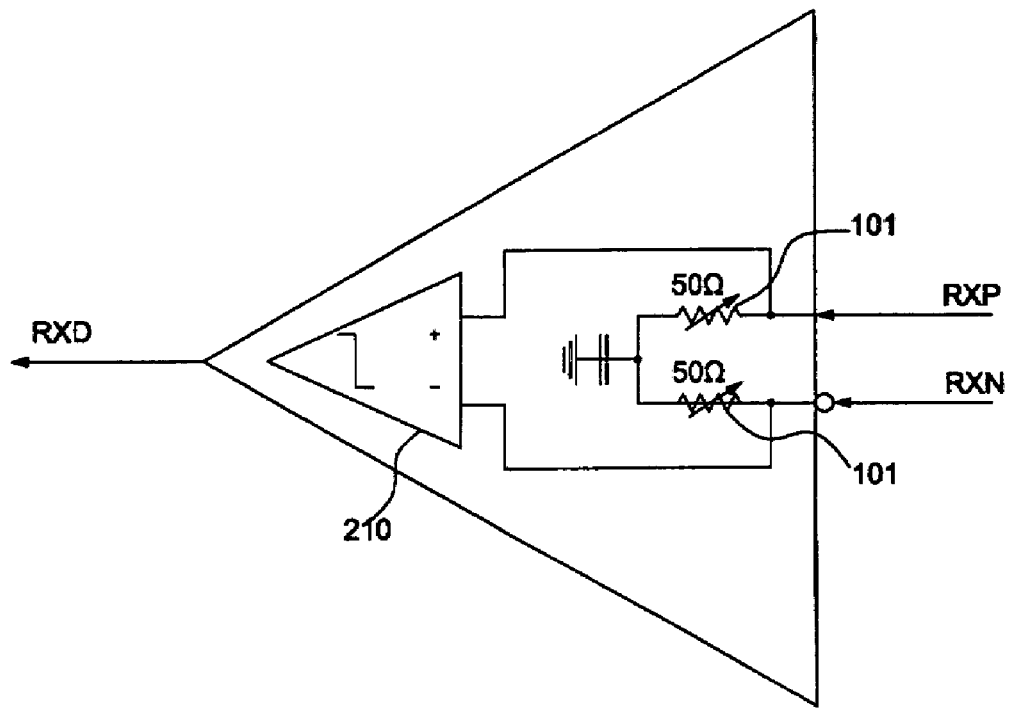
FIG. 2 is a circuit diagram of a receiving circuit in accordance with the SATA and the SAS standards.
Figure 3A:
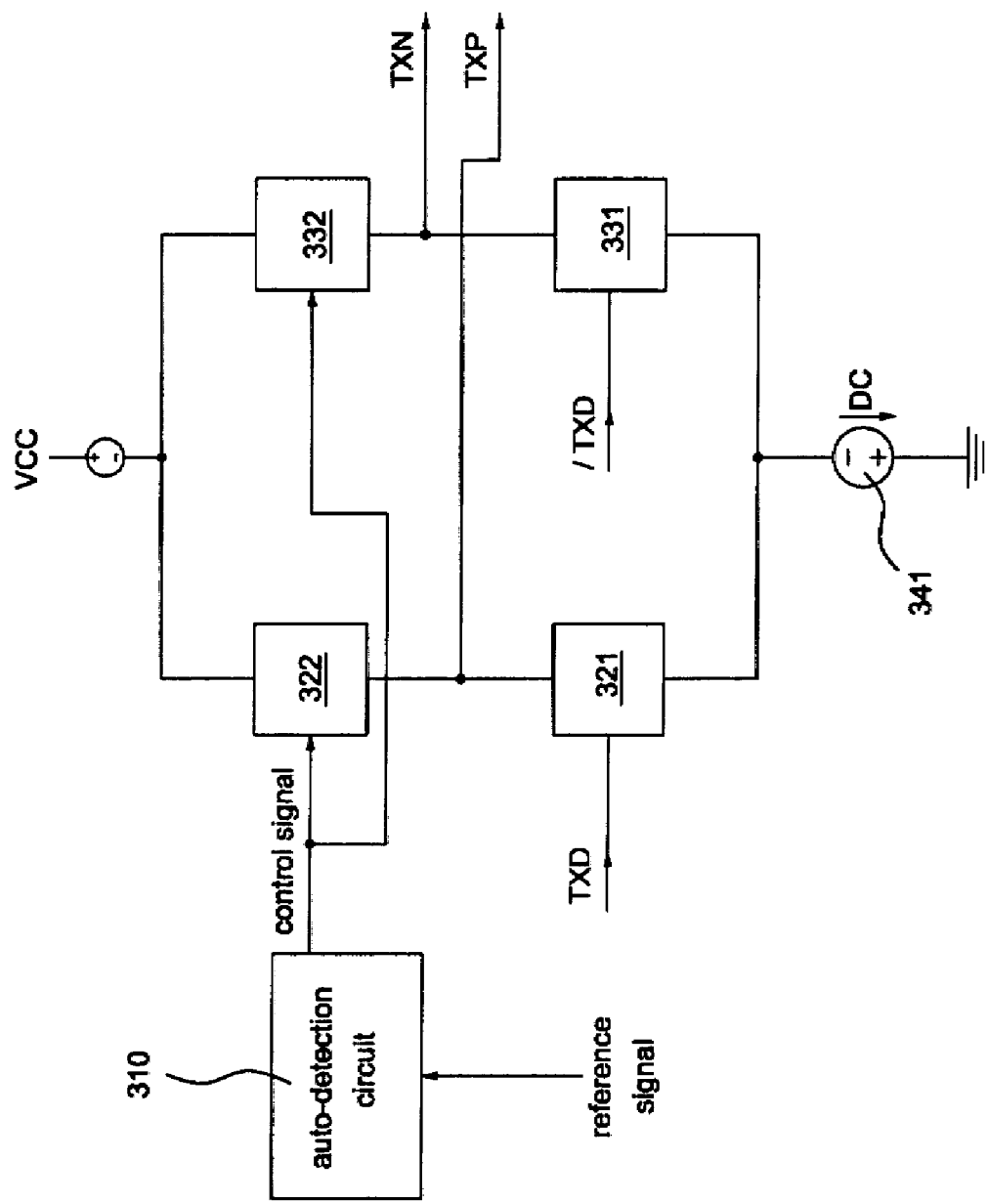
FIG. 3A is a circuit diagram of a transmitting circuit according to the invention.

FIG. 3A is a circuit diagram of a transmitting circuit according to the invention. Referring to FIG. 3A, the transmitting circuit 300, applied to the SATA and SAS interfaces, comprises two resistor units 322, 332, two switch units 321, 331, an auto-detection circuit 310 and a current source 341.

According to the potential of an external reference signal, the auto-detection circuit 310 disables or enables a control signal in order to control or modulate the equivalent impedance of resistor units 322, 332, thereby controlling the transmission of data signals. Resistor units 322, 332 are in the control of the control signal. When the control signal is enabled, the equivalent impedances of resistor units 322, 332 are modulated to a predetermined impedance value (for example: 50 ohm). On the other hand, when the control signal is disabled, the equivalent impedances of resistor units 322, 332 are modulated to a high impedance value. The input terminals of resistor units 322, 332 are connected to a voltage source VCC, and the output terminals of resistor units 322, 332 are connected to switch units 321, 331 respectively. Switch units 321, 331 respectively receive a transmitting data signal TXD and a reversed transmitting data signal /TXD. While the equivalent impedances of resistor units 322, 332 are modulated to a predetermined impedance (Hi-Z) value, switch units 321, 331 control the current flow directions of a first transmitting signal TXP and a second transmitting signal TXN. That is, the current flow first goes out along the direction of the second transmitting signal TXN and then comes in the reverse direction of the first transmitting signal TXP. While the equivalent impedances of resistor units 322, 332 are modulated to a high impedance value, the first transmitting signal TXP and the second transmitting signal TXN are at high impedance state, and therefore no signal is output.

Figure 3B:
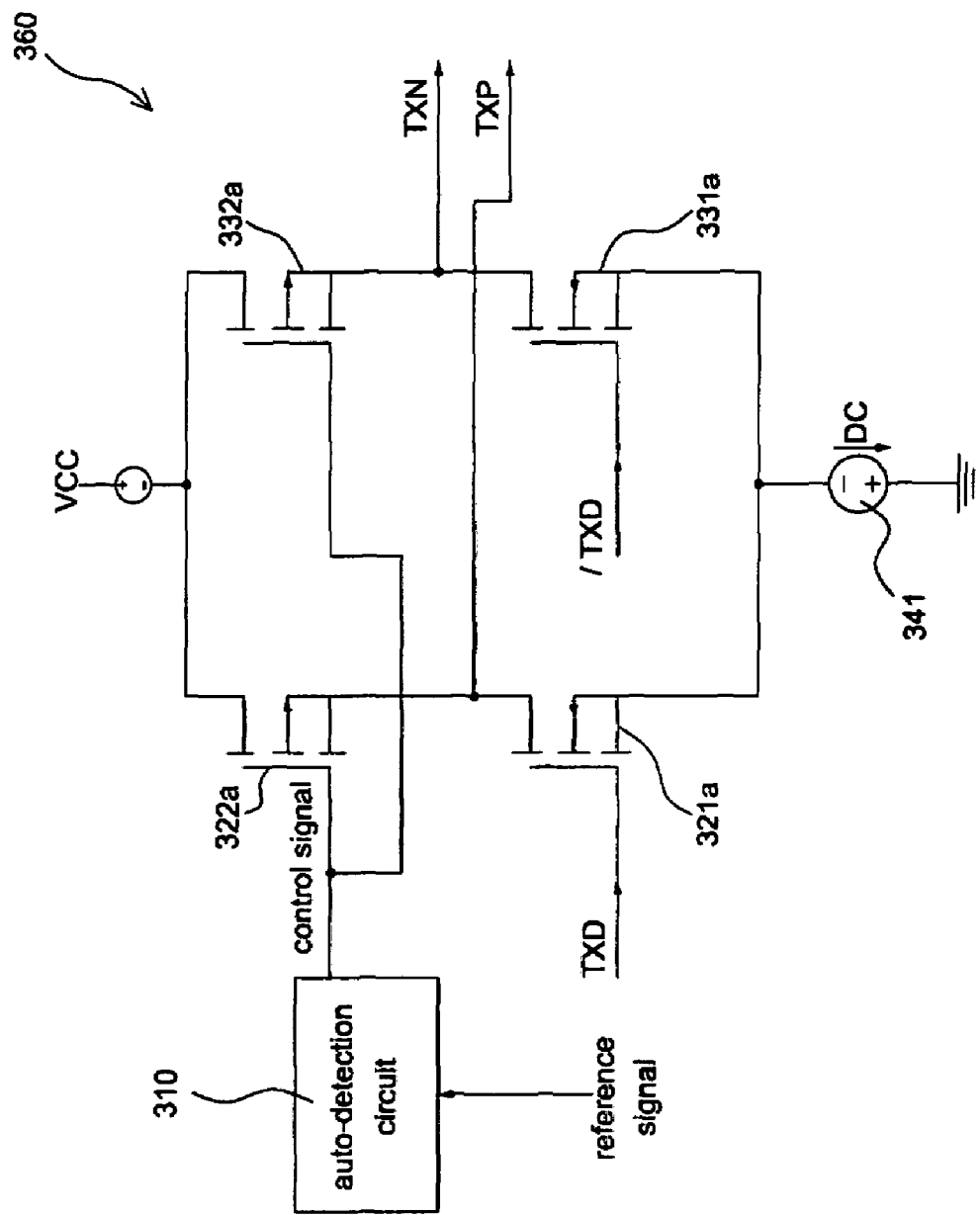
FIG. 3B is a circuit diagram of a transmitting circuit according to the first embodiment of the invention.

FIG. 3B is a circuit diagram of a transmitting circuit according to the first embodiment of the invention. Referring to FIG. 3B, the transmitting circuit 360 comprises two enhancement PMOS transistors 322a, 332a, two enhancement NMOS transistors 321a, 331a, an auto-detection circuit 310 and a current source 341. In this embodiment, the resistor unit 322 (332) in FIG. 3A is implemented by using an enhancement PMOS transistor 322a (332a). While working in the ohmic region, the enhancement PMOS transistor acts as a voltage variable resistor based on its own characteristic. According to the transistor specification, the invention modulates the equivalent impedance of the enhancement PMOS transistor to 50 ohm. While working in the cut-off region, the enhancement PMOS transistor acts as a turn-off switch (at a high impedance state). Furthermore, the resistor unit 321 (331) in FIG. 3A is implemented by using an enhancement NMOS transistor 321a (331a) in this embodiment. Thus, the impedance match is achieved through the equivalent impedances of the enhancement PMOS transistors equal to 50 ohm, and therefore the enhancement NMOS transistors 321a, 331a can respectively receive the transmitting data signal TXD and the reversed transmitting data signal /TXD to generate the first transmitting signal TXP and the second transmitting signal TXN. When transistors 322a, 332a work in the cut-off region, the first transmitting signal TXP and the second transmitting signal TXN are at high impedance state, and thus no signal is output.

Figure 3C:
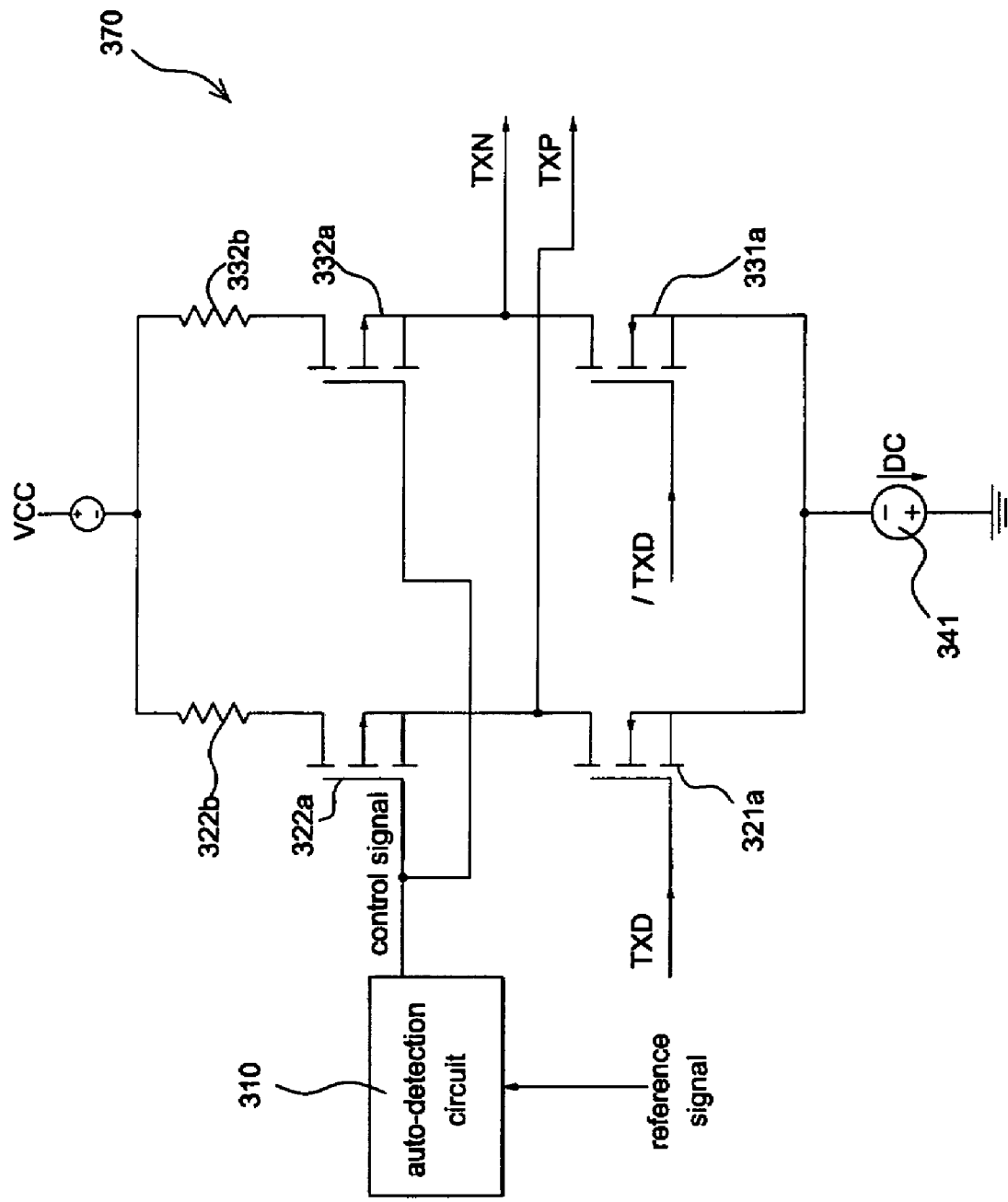
FIG. 3C is a circuit diagram of a transmitting circuit according to the second embodiment of the invention.

FIG. 3C is a circuit diagram of a transmitting circuit according to the second embodiment of the invention. Referring to FIG. 3C, the transmitting circuit 370 is quite similar to the transmitting circuit 360, except for having two 50-ohm resistors 322b, 332b. In this embodiment, the resistor unit 322 (332) is implemented by using a 50-ohm resistor 322b (332b) cascaded an enhancement PMOS transistor 322a (332a) as shown in FIG. 3C. For this situation, the enhancement PMOS transistor 322a (332a) is configured as a switch. Due to the small impedance of transistor 322a (332a), the 50-ohm impedance for impedance matching is entirely provided by resistors 322b (332b). Since the operations of the other devices included in the transmitting circuit 370 are illustrated above, the description is omitted here.

Figure 3D:
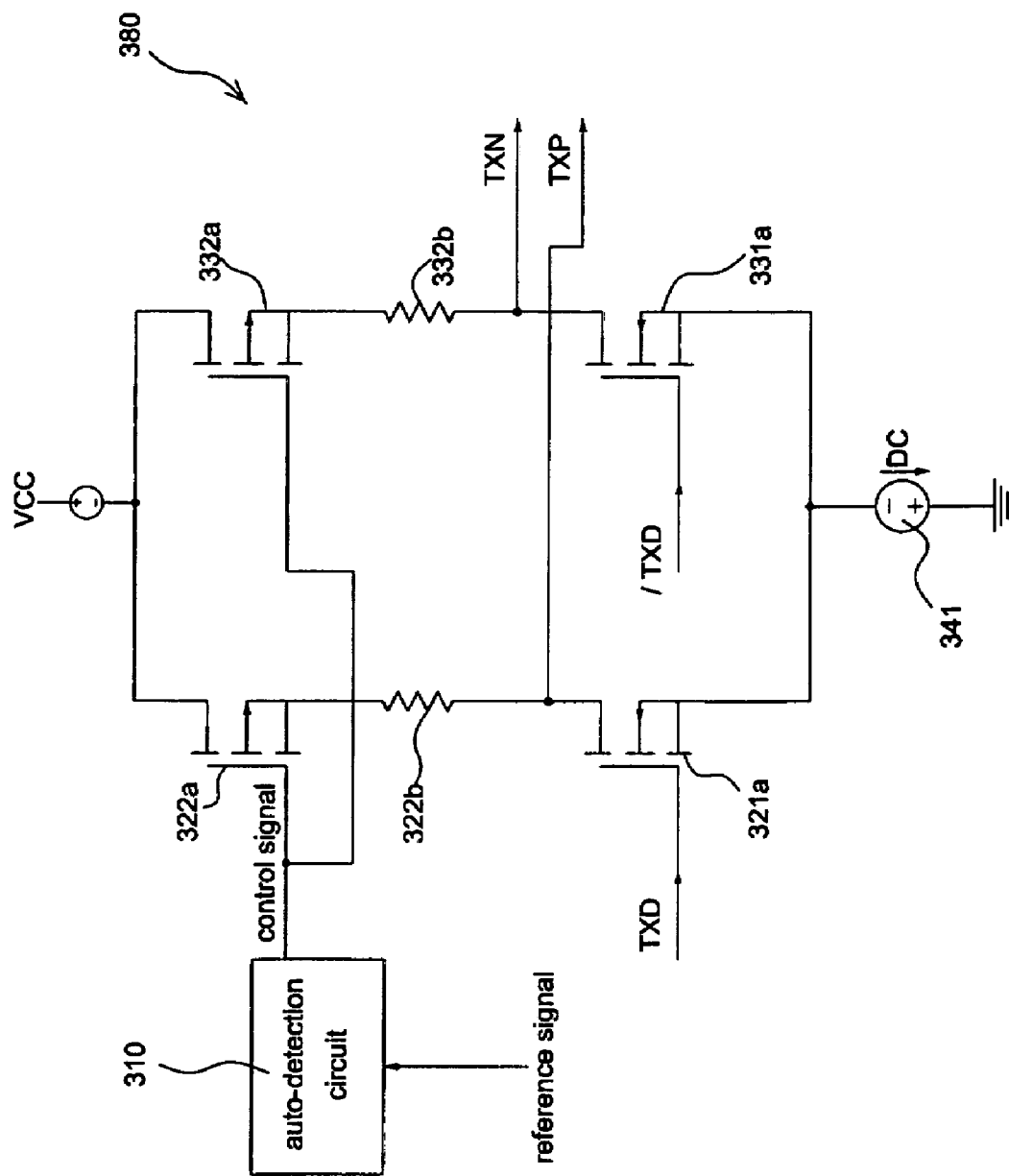
FIG. 3D is a circuit diagram of a transmitting circuit according to the third embodiment of the invention.

FIG. 3D is a circuit diagram of a transmitting circuit according to the third embodiment of the invention. Referring to FIG. 3D, the transmitting circuit 380 is similar to the transmitting circuit 370. With the resistor 322b (332b) and the enhancement PMOS transistor 322a (332a) having been exchanged with each other in the position, the transmitting circuit 380 performs the same operations as the transmitting circuit 370 does.

Figure 4A:
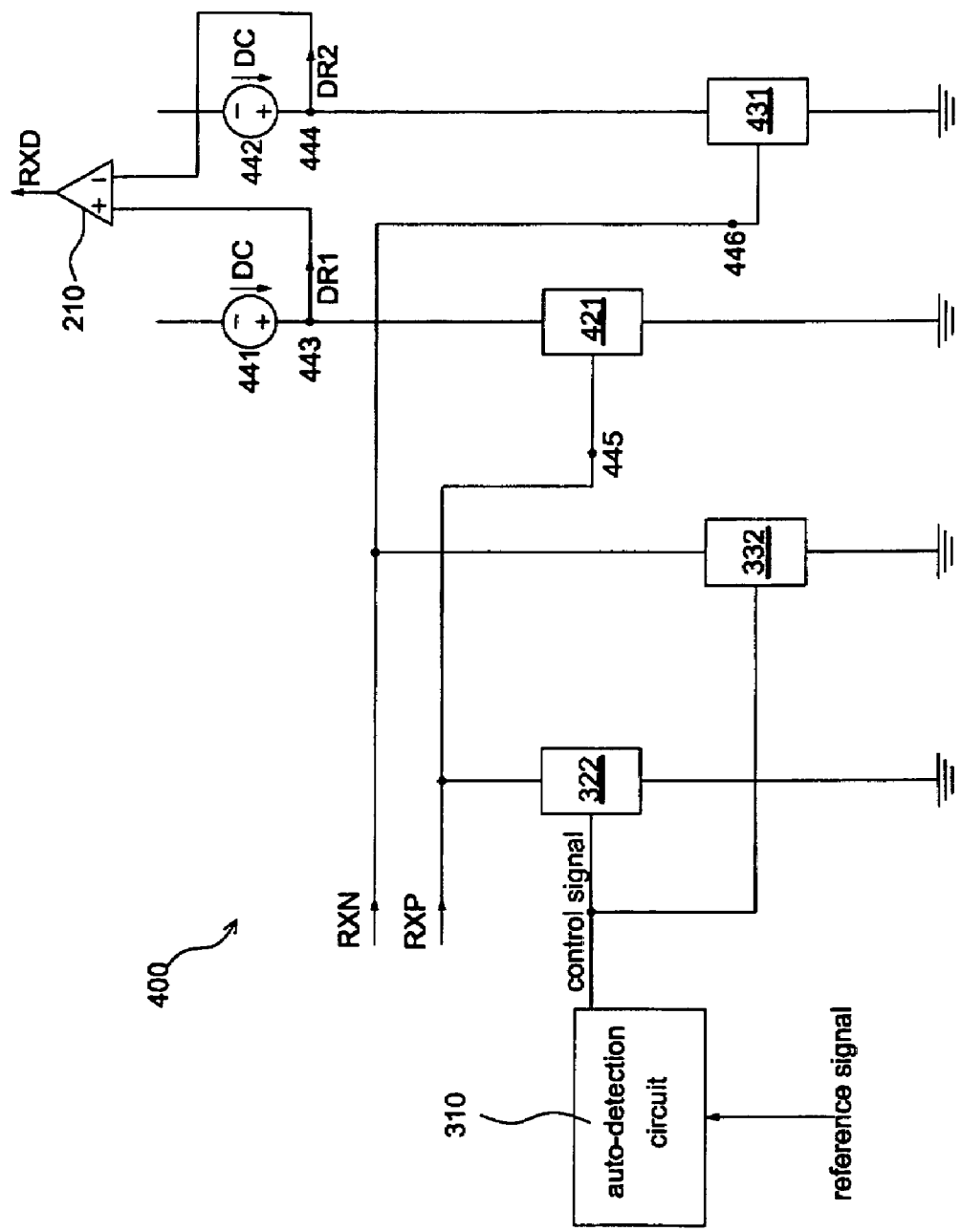
FIG. 4A is a circuit diagram of a receiving circuit according to the invention.

FIG. 4A is a circuit diagram of a receiving circuit according to the invention. Referring to FIG. 4A, the receiving circuit 400, applied to the SATA and SAS interfaces, comprises two resistor units 322, 332, two receiving units 421, 431, an auto-detection circuit 310, a differential amplifier 210 and two current sources 441, 442.

The input terminals of the resistor units 322, 332 respectively receive a first receiving signal RXP and a second receiving signal RXN, and are simultaneously controlled by the control signal output from the auto-detection circuit 310. When the control signal is enabled, the equivalent impedance of the resistor unit 322 (332) is modulated to a predetermined impedance value (for example, 50 ohm). On the other hand, the equivalent impedance of the resistor unit 322 (332) is modulated to a high impedance value while the control signal is disabled. While the output terminals of the receiving units 421, 431 are grounded, the input terminals 443, 444 are respectively connected to the current source 441, 442 and the input terminals 445, 446 receive the first receiving signal RXP and the second receiving signal RXN, so that the input terminals 443, 444 respectively generate a differential signal DR1 and a differential signal DR2. After receiving the differential signal DR1 and the differential signal DR2, the differential amplifier 210 amplifies the difference of two signals DR1, DR2 and then generates the receiving data signal RXD. As mentioned above, the auto-detection circuit 310 enables or disables the control signal to control or modulate two resistor units 322, 332 for impedance matching according to the potential of the external reference signal, thereby controlling the data signal transmission.

Figure 4B:
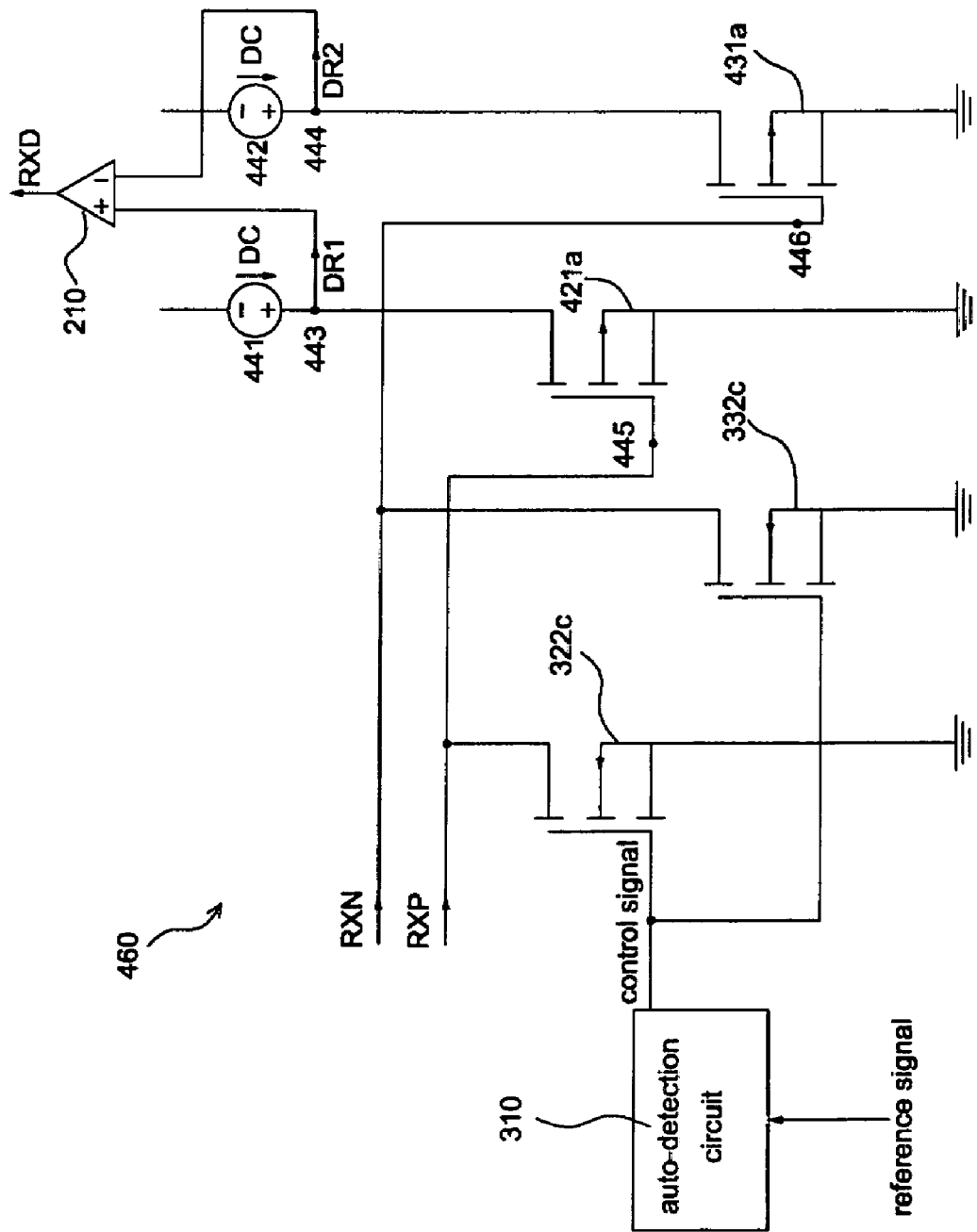
FIG. 4B is a circuit diagram of a receiving circuit according to the first embodiment of the invention.

FIG. 4B is a circuit diagram of a receiving circuit according to the first embodiment of the invention. Referring to FIG. 4B, the receiving circuit 460 comprises two enhancement NMOS transistors 322c, 332c, two enhancement PMOS transistors 421a, 431a, an auto-detection circuit 310, a differential amplifier 210 and two current sources 441, 442. In this embodiment, the resistor unit 322 (332) and the receiving unit 421 (431) in FIG. 4A are respectively implemented by using an enhancement NMOS transistor 322c (332c) and an enhancement PMOS transistor 421a (431a). The control signal is disabled or enabled by the auto-detection circuit 310, and then is used to modulate the equivalent impedance of the transistor 322c (332c) to 50 ohm for establishing data signal transmission or a high impedance value for terminating data signal transmission. If the control signal is disabled, the equivalent impedances of the transistors 322c, 332c are modulated to high impedance values such that the first receiving signal RXP and the second receiving signal RXN are incapable of passing through NMOS transistors 322c, 332c, and PMOS transistors 421a, 431a cannot be turned on. Contrarily, the equivalent impedances of the resistor units 322c, 332c are modulated to a predetermined impedance value if the control signal is enabled. Consequently, the first receiving signal RXP and the second receiving signal RXN not only pass through NMOS transistors 322c, 332c, but also pull down the potentials of the input terminals 445, 446, so that PMOS transistors 421a, 431a are switched on and then the differential signal DR1 and the differential signal DR2 are correspondingly generated.

Figure 4C:
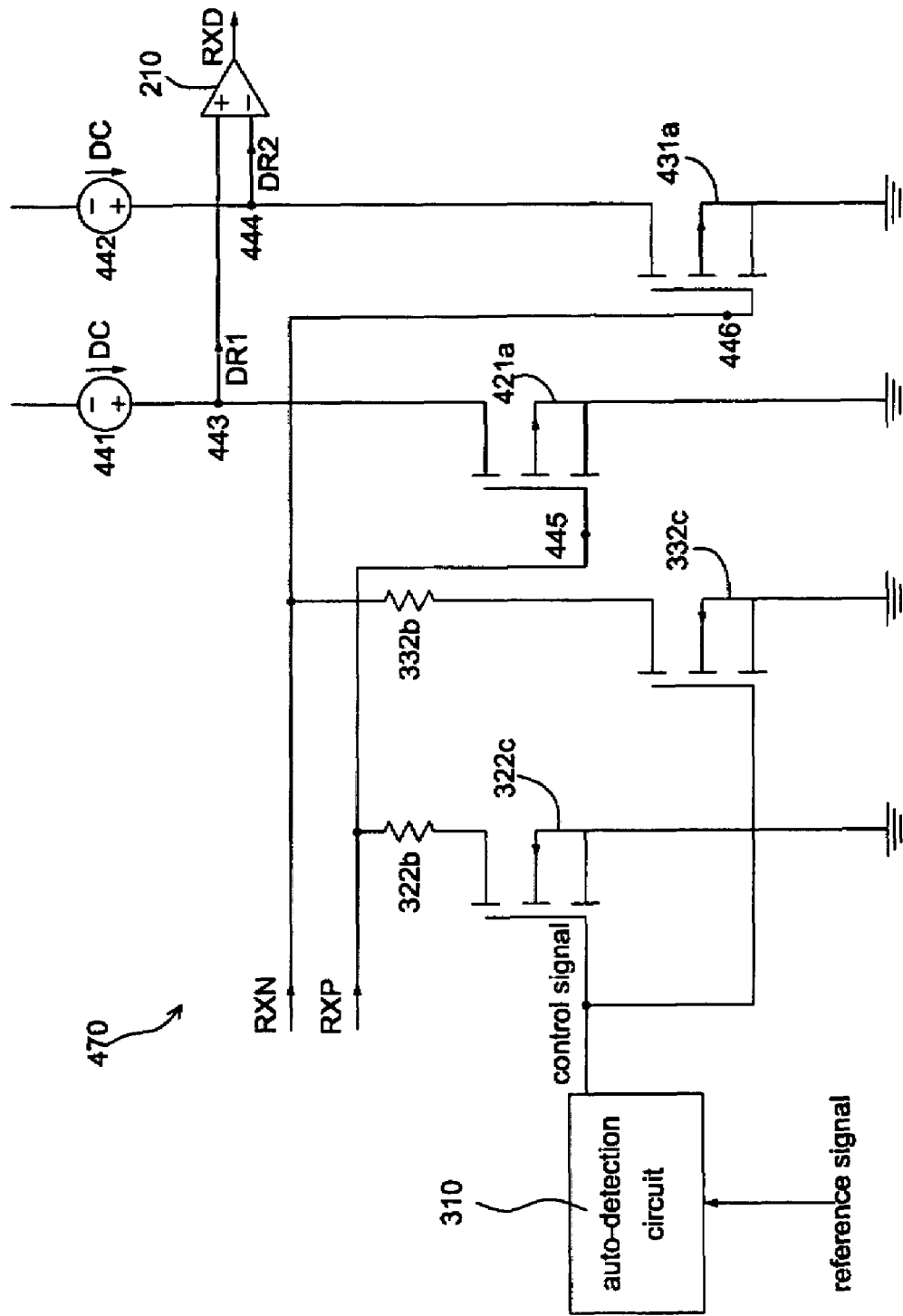
FIG. 4C is a circuit diagram of a receiving circuit according to the second embodiment of the invention.

FIG. 4C is a circuit diagram of a receiving circuit according to the second embodiment of the invention. Referring to FIG. 4C, the receiving circuit 470 is quite similar to the receiving circuit 460, except for having two 50-ohm resistors 322b, 332b. In this embodiment, the resistor unit 322 (332) is implemented by using a 50-ohm resistor 322b (332b) cascaded an enhancement NMOS transistor 322c (332c) as shown in FIG. 4C. For this situation, the enhancement NMOS transistor 322c (332c) acts like a switch and has a very small impedance. Thus, the 50-ohm impedance value for impedance matching is entirely provided by resistors 322b (332b). Since the other devices included in the receiving circuit 470 are illustrated above, the description of the operations is omitted here.

Figure 4D:
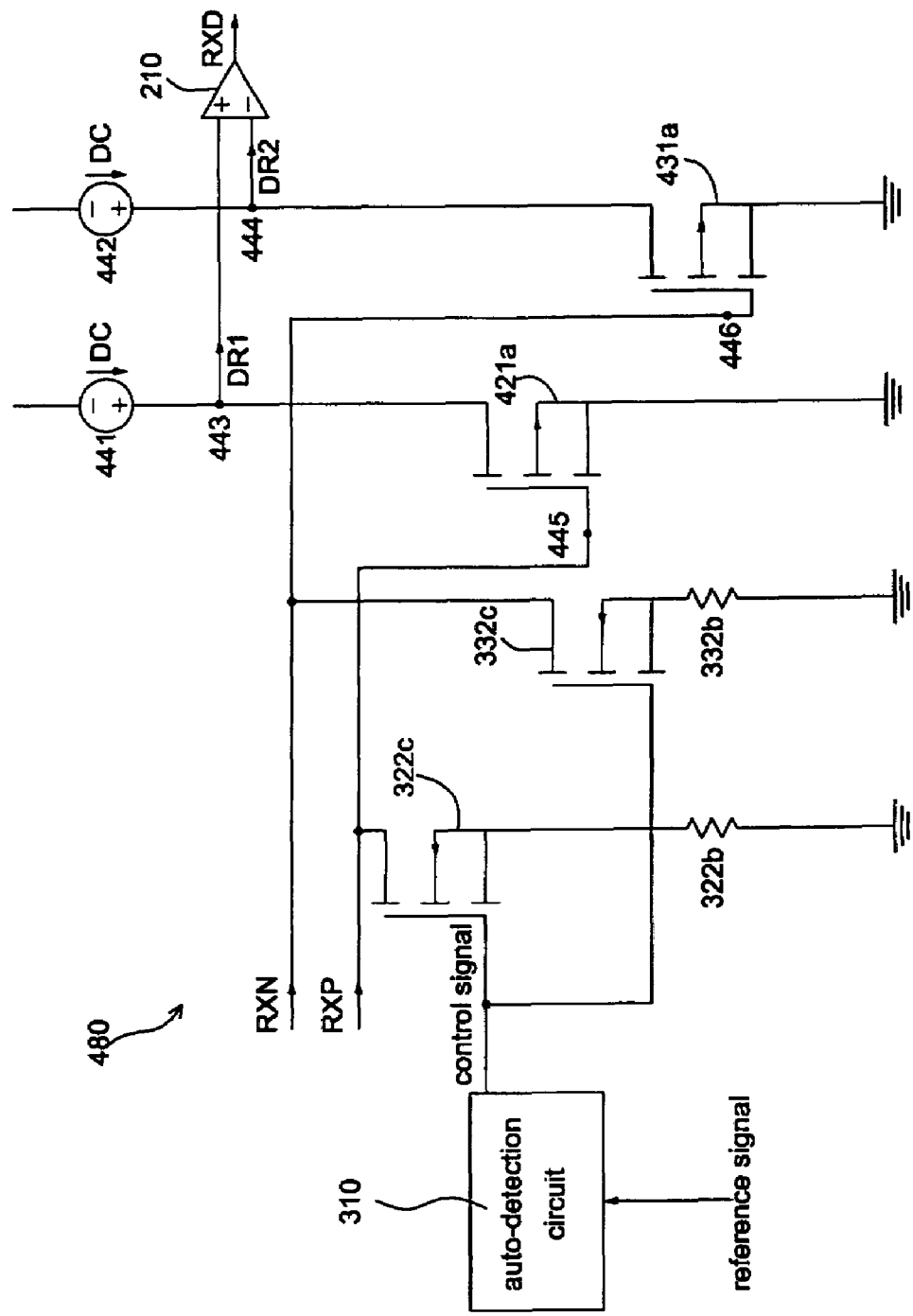
FIG. 4D is a circuit diagram of a receiving circuit according to the third embodiment of the invention.

FIG. 4D is a circuit diagram of a receiving circuit according to the third embodiment of the invention. Referring to FIG. 4D, the receiving circuit 480 is similar to the receiving circuit 470. With the resistor 322b (332b) and the enhancement NMOS transistor 322c (332c) having been exchanged with each other in the position, the operation of the receiving circuit 480 is also similar to that of the receiving circuit 470.

Figure 5:
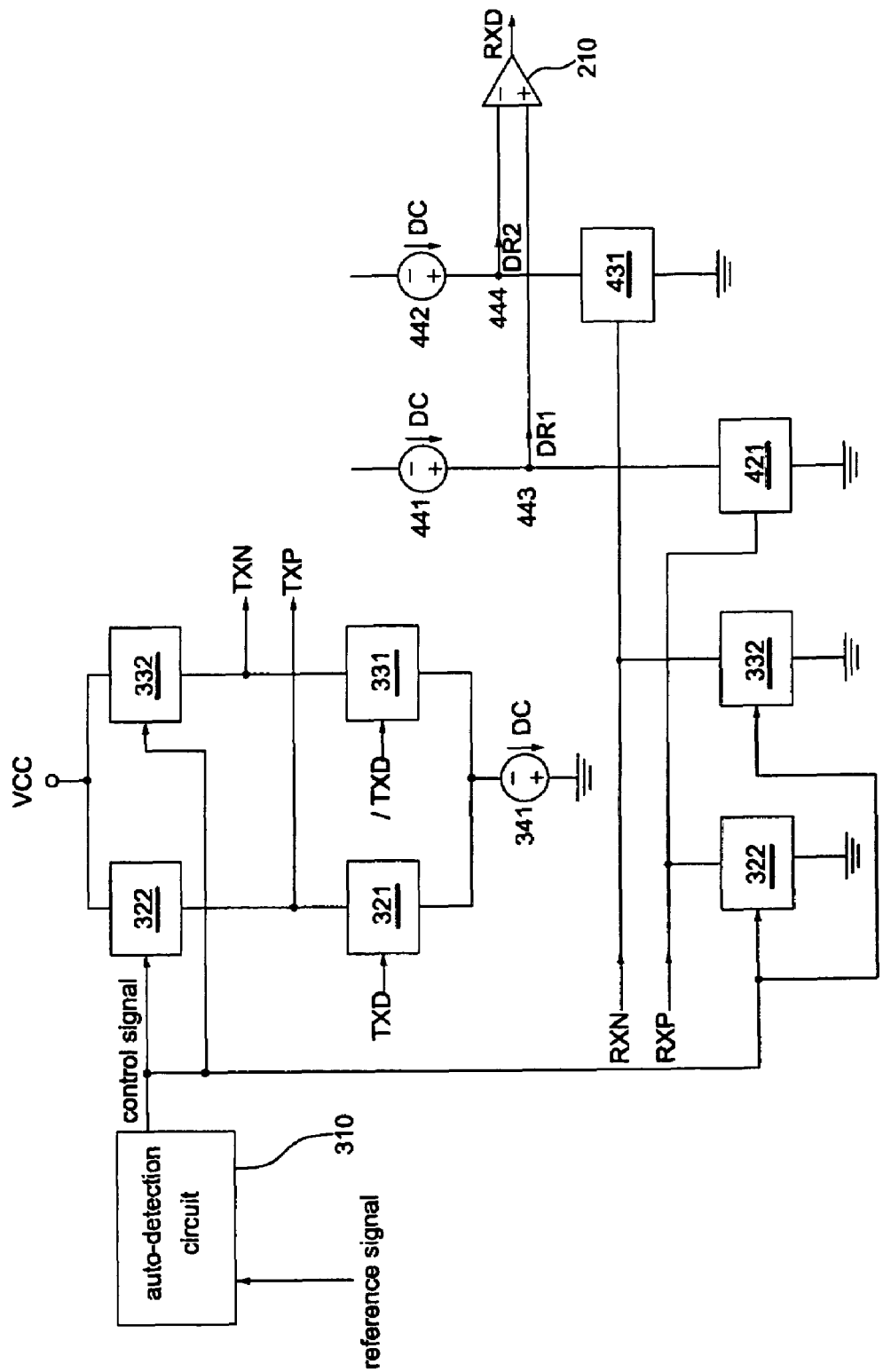
FIG. 5 is a circuit diagram of a transceiver circuit with a switching function according to the invention.

In practice, only one auto-detection circuit 310 is required to simultaneously control the start-up and shut-down of the transmitting and the receiving circuits. FIG. 5 is a circuit diagram of a transceiver circuit with switching function according to the invention. Referring to FIG. 5, the transceiver circuit 500 comprises an auto-detection circuit 310, two resistor units 322, two resistor units 332, two receiving units 421, 431, two switch units 321, 331, a differential amplifier 210 and three current sources 341, 441, 442. The operation of the transceiver circuit 500 is the same as that of the transmitting circuit 300 and that of the receiving circuit 400. The transceiver circuit 500 combines the two circuits 300, 400 which is controlled by a single auto-detection circuit 310.

Summarily, the invention uses transistors as differential impedance elements in the physical layer transceiver, and also uses the auto-detection circuit 310 for modulating the equivalent impedance of the transistors to a predetermined value (50 ohm) or high impedance values, thereby setting the enable/disable state of the connection. When the equivalent impedances of the transistors are modulated to a predetermined value, the impedance matching is constituted and then data transmission is under way. When the equivalent impedances of the transistors are modulated to be high impedance values, the connection between terminal equipment and the system is terminated. This is hereinafter called impedance modulating method.

Accordingly, the invention covers the group consisting of serial signal interfaces, such as serial ATA (SATA), serial attached small computer system interface (SAS), high definition multimedia interface (HDMI), peripheral controller interface express (PCI-EXP), and low voltage differential signal (LVDS). By incorporating the above-mentioned impedance modulating method with the exterior circuitry and layout design, the invention is applicable to a system with two or more serial transmission interfaces, and thereby develops a switching mechanism among a plurality of different serial signal transmission interfaces. The switching mechanism among a plurality of different serial signal transmission interfaces will be hereinafter detailed.

Figure 6A:
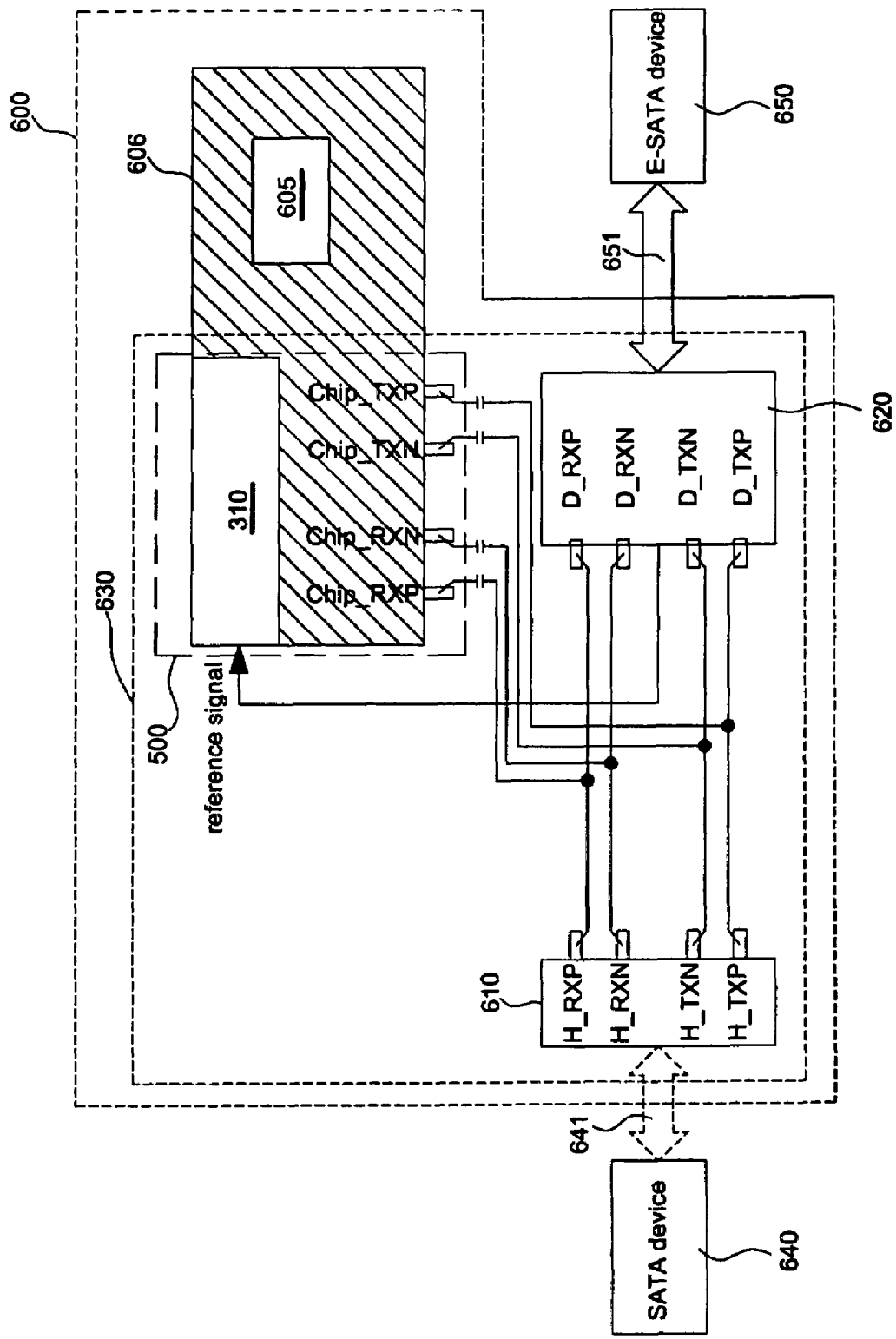
FIG. 6A is a circuit diagram of a device with an interface switching module according to an embodiment of the invention.

FIG. 6A is a circuit diagram of a device with an interface switching module according to an embodiment of the invention. Referring to FIG. 6A, the interface switching module 630 is applied to (or embedded in) a device 600 with two different serial signal transmission interfaces. The device 600 comprises components, such as a microprocessor 605, a random access memory (not shown) or a read only memory (not shown), to execute other operations or functions. The interface switching module 630 comprises a SATA connector 610, a E-SATA connector 620 and a transceiver circuit 500. In this embodiment, the transceiver circuit 500 and the microprocessor 605 are integrated into a single chip 606, and also integrated with the SATA connector 610 and the E-SATA connector 620 into a printed circuit board (PCB).

Due to transferring the same signals, both the SATA connector 610 and the E-SATA connector 620 have the same signal pins transferring the first transmitting signal TXP, the second transmitting signal TXN, the first receiving signal RXP and the second receiving signal RXN, and both also have three ground signals GND (not shown). The three ground signal pins of the SATA connector 610 are connected to the ground terminal of the device or the PCB. One side of the SATA connector 610 is connected to a SATA bus, and the other side is a socket capable of receiving the plug-in of the cable 641 being connected to the SATA device 640. The E-SATA connector 620 is also connected to the SATA bus, but one of the three ground pins is floated with the other ground pins being connected to the three ground pins of the SATA connector 610. Four signal pins TXP, TXN, RXP, RXN of the SATA bus are connected to the corresponding pins of the transceiver circuit 500. The floated ground pin of the E-SATA connector 620 is connected to the auto-detection circuit 310 and regarded as the reference signal for impedance modulation. One side of the E-SATA connector 620 is a socket, which is capable of receiving the plug-in of the cable 651 being connected to the E-SATA device 650. Once the plug of the cable 651 being connected to the E-SATA device 650 is plugged into the E-SATA connector 620, the potential of the floated ground pin of the E-SATA connector 620 is then pulled down to zero owing to the three ground pins of the cable 651 being all connected to ground. At this moment, the auto-detection circuit 310 detects the zero-voltage potential of the reference signal and then modulates the input and the output terminals of the transceiver circuit 500 to a high impedance state, thus allowing the transmission between the SATA device 640 and the E-SATA device 650.

The above-mentioned description of the switching mechanism between E-SATA and SATA interfaces is only an embodiment. In applications, the invention can be extended to general serial signal transmission interfaces, such as SAS, HDMI, PCI-EXP, LVDS . . . etc. For simplicity, hereinafter, device 600, E-SATA device 650 and SATA device 640 in FIG. 6A are renamed device A 660, device B 670 and terminal equipment 680 in FIGS. 6B, 6C.

Figure 6B:
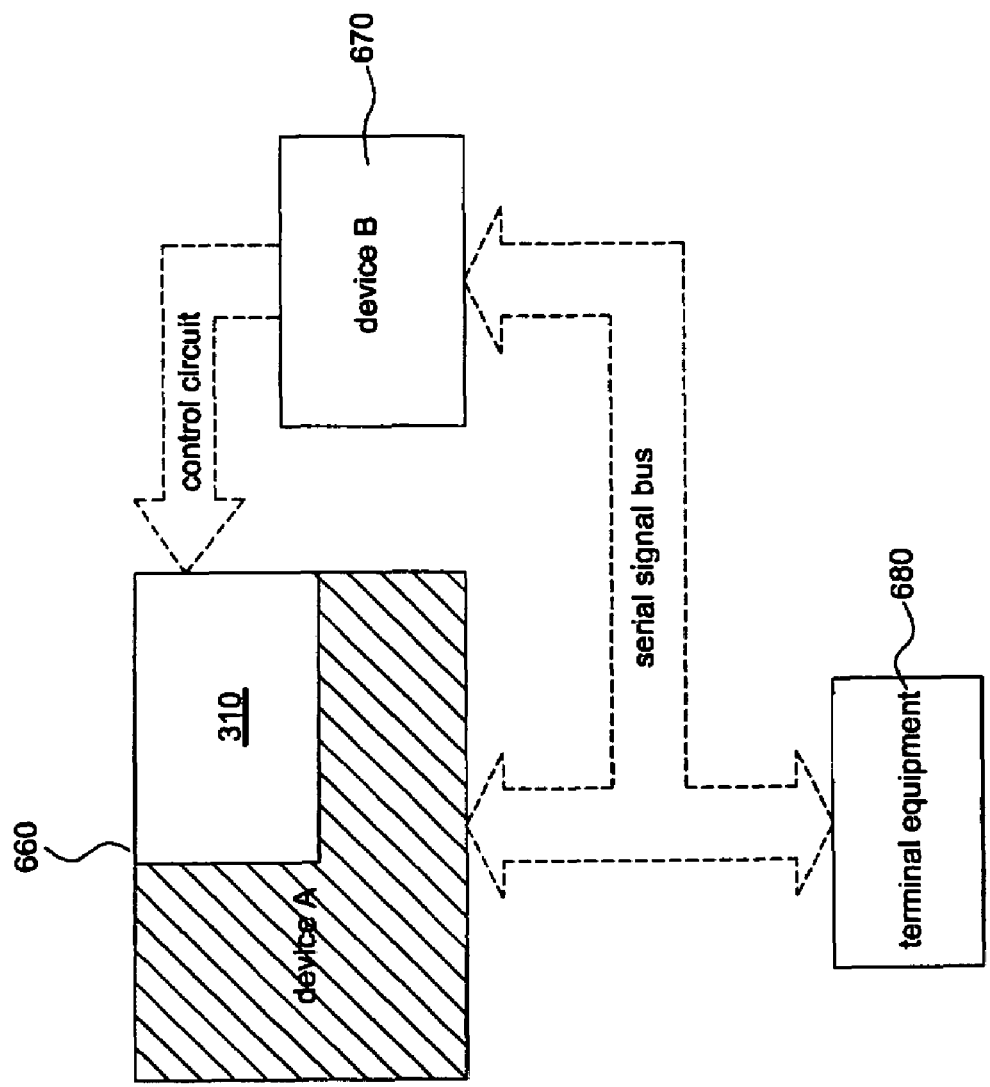
FIG. 6B shows the relationship and signal flows among device A with an interface switching module, device B and terminal equipment.
Figure 6C:
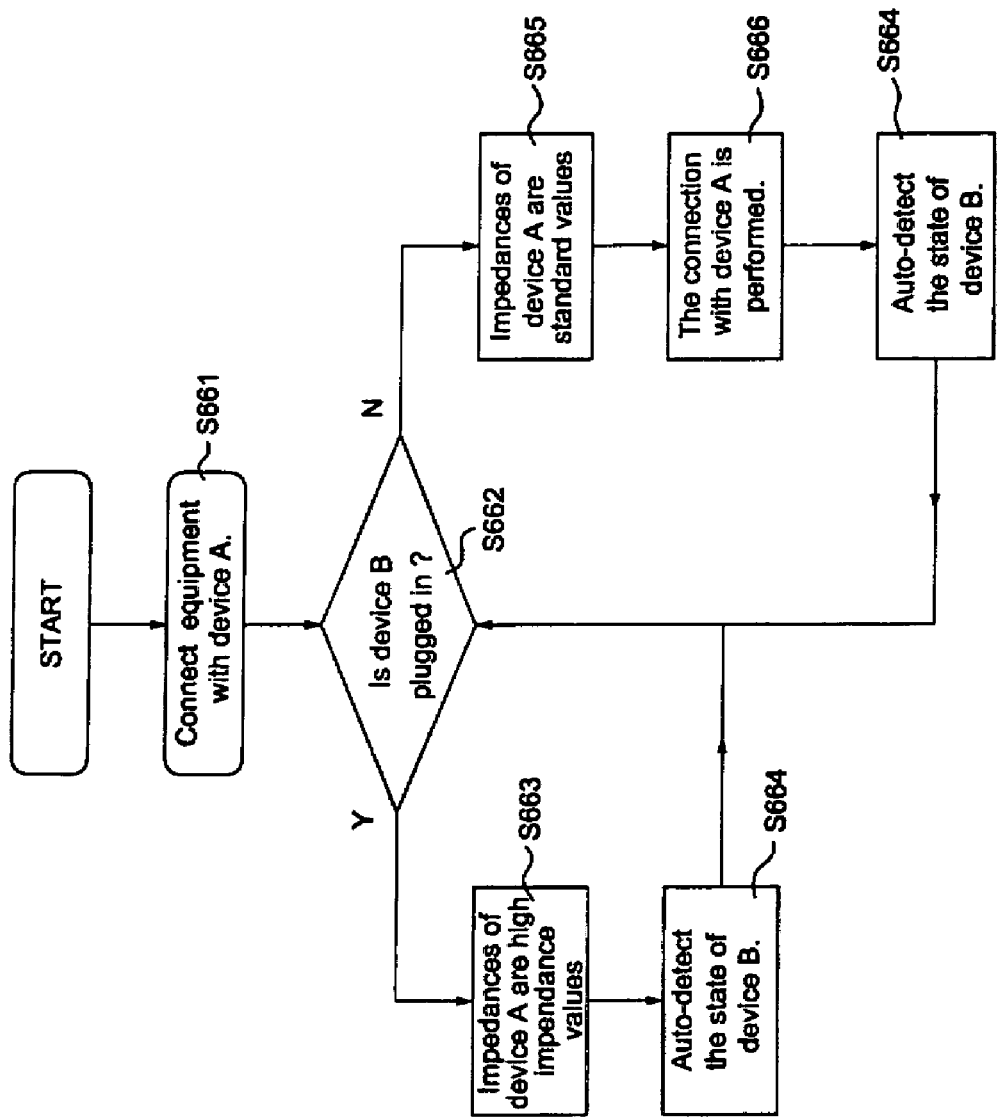
FIG. 6C is a flow chart illustrating the interface switching method used in the interface switching module.

FIG. 6B shows the relationship and signal flows among device A 660 with an interface switching module, device B 670 and terminal equipment 680. FIG. 6C is a flow chart illustrating the interface switching method used in the interface switching module.

Referring to FIGS. 6B, 6C, initially, in step S661, the device A 660 is connected to the terminal equipment 680 via the serial signal bus, and data exchange is performed between the device A 660 and the terminal equipment 680. Then, in step S662, the auto-detection circuit 310 determines whether the device B 670 is plugged into the E-SATA connector 620 or not. The control circuit, shown in FIG. 6B, represents the reference signal as the floated ground pin of the E-SATA connector 620 in FIG. 6A. According to the potential of the reference signal, the auto-detection circuit 310 determines whether the device B 670 is plugged in or not. If the potential of the reference signal is equal to zero, it represents that the device B 670 has been plugged into the E-SATA connector 620. In step S663, the auto-detection circuit 310 immediately modulates the equivalent impedance of resistor units 322, 332 to high impedance (Hi-Z) values (the impedance matching method). Thus, the connection between the device A 660 and the terminal equipment 680 is terminated so as to allow the data exchange between the device B 670 and the terminal equipment 680. Afterward, in step S664, the auto-detection circuit 310 continuously monitors the connection status of the device B 670 and the flow returns to step S662. In step 662, if the potential of the reference signal is equal to 1, it means that the plug of the device B 670 has been removed from the E-SATA connector 620. In step S665, the auto-detection circuit 310 immediately modulates the equivalent impedance of resistor units 322, 332 to a standard impedance value (the impedance matching method) to establish the connection between the device A 660 and the terminal equipment 680. Lastly, in step 666, the data transmission between the device A 660 and the terminal equipment 680 is performed. In step S664, the auto-detection circuit 310 continuously monitors the connection status of the device B 670 and the flow returns to step S662.

According to the invention, the feature of the interface switching module 630 is sharing a serial signal data bus. Accordingly, while the device B 670 exists, the device A with the interface switching module 630 breaks up the connection with the terminal equipment 680. While the device B 670 doesn't existed, the device A with the interface switching module 630 establishes the connection with the terminal equipment 680 to avoid the serial signal bus conflict.

Based on cost, design simplicity and convenience, IC designers achieve the same effect as prior art does by using the impedance modulating method. The invention not only saves time and cost of research and development, but also solves the noise and timing delay problems upon internal high speed switching. With a plurality of transmission interfaces having been integrated in a single unit, all the system designers have to do is simply think up the hardware layout, thus significantly reducing product cost.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A transmitting circuit for a serial transmission interface that receives a transmitting data signal to generate a pair of transmitting signals, comprising:
   a first resistor unit controlled by a control signal, wherein the first resistor unit has a predetermined impedance value while the control signal is enabled, or has a high-impedance value while the control signal is disabled;
   a first switch unit connected to the first resistor unit and controlled by the transmitting data signal, wherein the connecting node of the first switch unit and the first resistor unit is defined as a first terminal;
   a second resistor unit controlled by the control signal, wherein the second resistor unit has the predetermined impedance value while the control signal is enabled or has the high impedance value while the control signal is disabled;
   a second switch unit connected to the second resistor unit and controlled by the reverse signal of transmitting data signal, wherein the connecting node of the second switch unit and the second resistor unit is defined as a second terminal; and
   an auto-detection circuit for generating the control signal according to a reference signal;
   wherein the pair of transmitting signals are output from the first terminal and the second terminal, and the pair of transmitting signals are determined by the transmitting data signal while the control signal is enabled, or the pair of transmitting signals are at a high impedance state without output from the first terminal and the second terminal while the control signal is disabled.

2. The transmitting circuit of claim 1, wherein the first resistor unit and the second resistor unit are transistors having gates receiving the control signal, drains being connected to a voltage source and sources being defined as the first terminal and the second terminal respectively.

3. The transmitting circuit of claim 1, wherein the first resistor unit and the second resistor unit both comprise:
   a resistor having the predetermined impedance value, wherein one terminal of the resistor is connected to a voltage source; and
   a transistor having a gate receiving the control signal, a drain being connected to the other terminal of the resistor, and a source being defined as the first terminal and the second terminal respectively.

4. The transmitting circuit of claim 1, wherein the first resistor unit and the second resistor unit both comprise:
   a transistor having a gate receiving the control signal and a drain being connected to a voltage source; and
   a resistor, having the predetermined impedance value, wherein one side of the resistor is connected to a source of the transistor, and the other side of the resistor is defined as the first terminal and the second terminal.

5. The transmitting circuit of claim 1, wherein the first switch unit and the second switch unit are transistors, the transistors having gates receiving the transmitting data signal and the reverse signal of the transmitting data signal respectively, drains being connected to the first resistor unit and the second resistor unit respectively, and sources being connected to a current source.

6. A receiving circuit for a serial transmission interface that receives a first receiving signal and a second receiving signal to generate a receiving data signal, comprising:
   a first resistor unit for receiving the first receiving signal and a control signal, wherein the first resistor unit has a predetermined impedance value while the control signal is enabled, or has a high impedance value while the control signal is disabled;

a second resistor unit for receiving the second receiving signal and the control signal, wherein the second resistor unit has the predetermined impedance value while the control signal is enabled, or has the high impedance value while the control signal is disabled;

a first receiving unit, responsive to the first receiving signal, for generating a first differential signal;

a second receiving unit, responsive to the second receiving signal, for generating a second differential signal;

a differential amplifier for receiving the first differential signal and the second differential signal and generating the receiving data signal; and an auto-detection circuit for generating the control signal according to a reference signal;

wherein both the first resistor unit and the second resistor unit have the high impedance values such that the first receiving signal and the second receiving signal are incapable of passing through the first resistor unit and the second resistor unit respectively while the control signal is disabled.

7. The receiving circuit of claim 6, wherein the first resistor unit and the second resistor unit are transistors having gates receiving the control signal, drains respectively receiving the first receiving signal and the second receiving signal and sources being connected to ground.

8. The receiving circuit of claim 6, wherein the first resistor unit and the second resistor unit both comprise.

a resistor having the predetermined impedance value, one terminal of the resistor receiving the first receiving signal and the second receiving signal respectively; and a transistor having a gate receiving the control signal, a drain being connected to the other terminal of the resistor and a source being connected to ground.

9. The receiving circuit of claim 6, wherein the first resistor unit and the second resistor unit both comprise:

a transistor having a gate for receiving the control signal and a drain for receiving the first receiving signal and the second receiving signal respectively; and a resistor having a resistance value equal to the predetermined impedance value, wherein one terminal of the resistor is connected to a source of the transistor, and the other terminal of the resistor is connected to ground.

10. The receiving circuit of claim 6, wherein the first receiving unit and the second receiving unit are transistors, the transistors having gates respectively receiving the first receiving signal and the second receiving signal, drains being connected to a current source, and sources being connected to ground.

11. An interface switching module for a system with two serial transmission interfaces, comprising:

a first interface connector having two first transmitting pins for delivering a pair of transmitting signals, two first receiving pins for delivering a pair of receiving signals, and a plurality of first ground pins connected to the ground terminal of the system;

a second interface connector having two second transmitting pins connected to the first transmitting pins, two second receiving pins connected to the first receiving pins, a control pin and a plurality of second ground pins connected to the ground terminal of the system, wherein the control pin is grounded when a plug is plugged into the second interface connector, otherwise the control pin is floated; and a transceiver circuit for generating the pair of transmitting signals to the first interface connector and for receiving the pair of receiving signals from the first interface connector when the control pin is floated.

12. The interface switching module of claim 11, wherein the system is a cascaded redundant arrays of independent disks (RAID) with serial ATA (SATA).

13. The interface switching module of claim 11, wherein the transceiver circuit generates the pair of transmitting signals according to a transmitting data signal, and also generates a receiving data signal according to the pair of receiving signals, the transceiver circuit comprising:

an auto-detection circuit for generating a control signal according to the potential of the control pin;

a first resistor unit controlled by the control signal, wherein the first resistor unit has a predetermined impedance value while the control signal is enabled or has a high impedance value while the control signal is disabled;

a first switch unit connected to the first resistor unit and controlled by the transmitting data signal, wherein the connecting node of the first switch unit and the first resistor unit is defined as a first terminal;

a second resistor unit controlled by the control signal, wherein the second resistor unit has the predetermined impedance value while the control signal is enabled or has a high-impedance value while the control signal is disabled;

a second switch unit connected to the second resistor unit and controlled by the reverse signal of transmitting data signal, wherein the connecting node of the second switch unit and the second resistor unit is defined as a second terminal;

a third resistor unit for receiving one of the receiving signals and the control signal, that has the predetermined impedance value while the control signal is enabled, or has the high impedance value while the control signal is disabled;

a fourth resistor unit for receiving the other of the receiving signals and the control signal, that has the predetermined impedance value while the control signal is enabled or has the high impedance value while the control signal is disabled;

a first receiving unit responsive to one of the receiving signals for generating a first differential signal;

a second receiving unit responsive to the other of the receiving signals for generating a second differential signal; and a differential amplifier for receiving the first differential signal and the second differential signal and generating the receiving data signal;

wherein the pair of transmitting signals are output from the first terminal and the second terminal, and are determined by the transmitting data signal while the control signal is enabled, otherwise, the pair of transmitting signals are at the high impedance state, and both the third resistor unit and the fourth resistor unit have high impedance values such that the pair of receiving signals are incapable of passing through the third resistor unit and the fourth resistor unit.

14. The interface switching module of claim 13, wherein the first resistor unit and the second resistor unit are transistors having gates receiving the control signal, drains being connected to a voltage source, and sources being defined as the first terminal and the second terminal respectively.

15. The interface switching module of claim 13, wherein the third resistor unit and the fourth resistor unit are transistors having gates receiving the control signal, drains receiving the first receiving signal and the second receiving signal, and sources being connected to ground.

16. The interface switching module of claim 13, wherein the first resistor unit and the second resistor unit both comprise:
   a resistor having the predetermined impedance value, wherein one terminal of the resistor is connected to a voltage source; and
   a transistor having a gate for receiving the control signal, a drain being connected to the other terminal of the resistor, and a source being defined as the first terminal and the second terminal.

17. The interface switching module of claim 13, wherein the first resistor unit and the second resistor unit both comprise:
   a transistor having a gate receiving the control signal and a drain being connected to a voltage source; and
   a resistor having the predetermined impedance value, wherein one terminal of the resistor is connected to a source of the transistor, and the other terminal is defined as the first terminal and the second terminal.

18. The interface switching module of claim 13, wherein the third resistor unit and the fourth resistor unit both comprise:
   a resistor having the predetermined impedance value, wherein one terminal of the resistor receives the pair of receiving signals, respectively; and
   a transistor having a gate receiving the control signal, a drain being connected to the other terminal of the resistor and a source being connected to ground.

19. The interface switching module of claim 13, wherein the third resistor unit and the fourth resistor unit both comprise:
   a transistor having a gate receiving the control signal and a drain receiving the pair of receiving signals, respectively; and
   a resistor having a resistance value equal to the predetermined impedance value, wherein one terminal of the resistor is connected to a source of the transistor, and the other terminal is connected to ground.

20. The interface switching module of claim 13, wherein the first switch unit and the second switch unit are transistors, the transistors having gates receiving the transmitting data signal and the reverse signal of transmitting data signal, drains being connected to the first resistor unit and the second resistor unit respectively, and sources being connected to a current source.

21. The interface switching module of claim 13, wherein the first receiving unit and the second receiving unit are transistors, the transistors having gates receiving the pair of receiving signals, respectively, drains being connected to a current source, and sources being connected to ground.

22. An interface switching method for a system having an interface switching module that switches between a first serial transmission interface and a second serial transmission interface, the interface switching method comprising:
   connecting the system with a first device having the first serial transmission interface;
   determining whether a second device having the second serial transmission interface is connected to the system or not;
   disconnecting the system from the first device by using an impedance modulating method if the second device is connected to the system, and then returning to the step of determining; and
   connecting the system with the first device by using the impedance modulating method if the second device is not connected to the system, and then returning to the step of determining.

23. The interface switching method of claim 22, wherein the impedance modulating method comprises:
   using an auto-detection circuit to modulate the equivalent impedances of resistor units of the interface switching module with a high impedance value when disconnecting the system from the first device; and
   when connecting the system with the first device, using the auto-detection circuit to modulate the equivalent impedances of all the resistor units of the interface switching module with a predetermined impedance value.

24. The interface switching method of claim 23, wherein each said resistor unit is a transistor, or a resistor cascaded a transistor.

* * * * *